United States Patent
Papanikolaou et al.

(10) Patent No.: US 8,061,753 B2
(45) Date of Patent: Nov. 22, 2011

(54) UNIVERSAL TAILGATE HINGE

(75) Inventors: Kosta Papanikolaou, Huntington Woods, MI (US); Charles Gregory Bambenek, Northville, MI (US); Fritz Cory, Belleville, MI (US); Jason Falenski, Berkley, MI (US); Adrian Nicholas Alexander Elliott, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 333 days.

(21) Appl. No.: 12/356,198

(22) Filed: Jan. 20, 2009

(65) Prior Publication Data

US 2010/0181795 A1   Jul. 22, 2010

(51) Int. Cl.
*B62D 33/027* (2006.01)
*E05D 7/00* (2006.01)
*E05D 7/02* (2006.01)
*E05D 7/06* (2006.01)
*E05D 7/10* (2006.01)

(52) U.S. Cl. ........... 296/51; 16/224; 16/302; 49/192; 49/247; 296/146.8; 296/146.12

(58) Field of Classification Search ............ 16/221, 16/224, 260, 302; 49/149, 208, 246, 247, 49/192; 296/50, 51, 56, 57.1, 146.8, 146.11, 296/146.12

See application file for complete search history.

(56) References Cited

U.S. PATENT DOCUMENTS

| | | | |
|---|---|---|---|
| 1,828,450 A * | 10/1931 | Shaffer | 296/51 |
| 2,260,504 A * | 10/1941 | Barrett | 296/51 |
| 2,506,849 A * | 5/1950 | Winterton | 296/51 |
| 2,612,139 A * | 9/1952 | Collins | 119/865 |
| 2,806,735 A * | 9/1957 | Smith | 296/51 |
| 3,008,177 A * | 11/1961 | Wooten, Jr. | 16/224 |
| 3,020,084 A * | 2/1962 | Sylvester | 296/51 |
| 3,387,406 A | 6/1968 | Coker et al. | |
| 3,400,974 A * | 9/1968 | Gage | 296/146.12 |
| 3,567,274 A | 3/1971 | Kaptur, Jr. et al. | |
| 3,623,764 A | 11/1971 | Jacobus | |
| 3,691,788 A * | 9/1972 | Mazziotti | 464/139 |
| 3,853,414 A * | 12/1974 | Hirano et al. | 403/71 |
| 4,076,301 A | 2/1978 | Gergoe | |
| 4,114,401 A * | 9/1978 | Van Hoose | 464/120 |
| 4,968,171 A * | 11/1990 | Shell | 403/4 |
| 5,596,789 A * | 1/1997 | Simioni | 16/228 |
| 5,897,417 A * | 4/1999 | Grey | 446/125 |
| 6,742,826 B2 | 6/2004 | Humphrey et al. | |
| 6,764,130 B1 | 7/2004 | Hull | |
| 6,805,393 B1 * | 10/2004 | Stevenson et al. | 296/50 |
| 6,938,941 B2 | 9/2005 | Thiele et al. | |
| 7,080,868 B2 | 7/2006 | McClure et al. | |
| 7,093,876 B2 | 8/2006 | Romig et al. | |
| 7,118,153 B2 | 10/2006 | Kitayama et al. | |
| 7,147,257 B2 | 12/2006 | Johansen et al. | |
| 7,150,486 B2 * | 12/2006 | Ichinose | 296/51 |
| 7,165,800 B2 * | 1/2007 | Thiele et al. | 296/50 |
| 7,201,422 B2 * | 4/2007 | Plett et al. | 296/51 |
| 7,201,423 B2 | 4/2007 | Ichinose | |

(Continued)

*Primary Examiner* — Glenn Dayoan
*Assistant Examiner* — Paul Chenevert
(74) *Attorney, Agent, or Firm* — Price Heneveld LLP

(57) ABSTRACT

An entry assembly includes a frame and a gate. The frame has a first side and a second side. The gate is connected to the frame. The gate defines a demarcation between the first side and the second side of the frame. The gate is pivotable about the frame along at least two axes of rotation. Each axis of rotation intersects at least one of the at least two axes of rotation.

24 Claims, 12 Drawing Sheets

U.S. PATENT DOCUMENTS

| | | | |
|---|---|---|---|
| 7,243,973 | B2 | 7/2007 | Plett et al. |
| 7,258,373 | B2 | 8/2007 | Plett et al. |
| 7,481,479 | B1 * | 1/2009 | Townson et al. ............... 296/51 |
| 7,597,374 | B1 * | 10/2009 | Townson et al. ............... 296/51 |
| 7,669,908 | B2 * | 3/2010 | Townson ........................ 296/51 |
| 7,690,710 | B2 * | 4/2010 | Townson et al. ............ 296/57.1 |
| 7,731,260 | B2 * | 6/2010 | Heller ............................ 296/50 |
| 2002/0105202 | A1 | 8/2002 | Ziv-Av |
| 2006/0152029 | A1 * | 7/2006 | Tomasson et al. ............. 296/51 |
| 2006/0186691 | A1 | 8/2006 | Sugimoto et al. |
| 2007/0284903 | A1 | 12/2007 | Waldner et al. |
| 2007/0296226 | A1 | 12/2007 | Gruber et al. |
| 2009/0250961 | A1 * | 10/2009 | Townson ...................... 296/57.1 |
| 2010/0264638 | A1 * | 10/2010 | Meijer ........................ 280/841 |

* cited by examiner

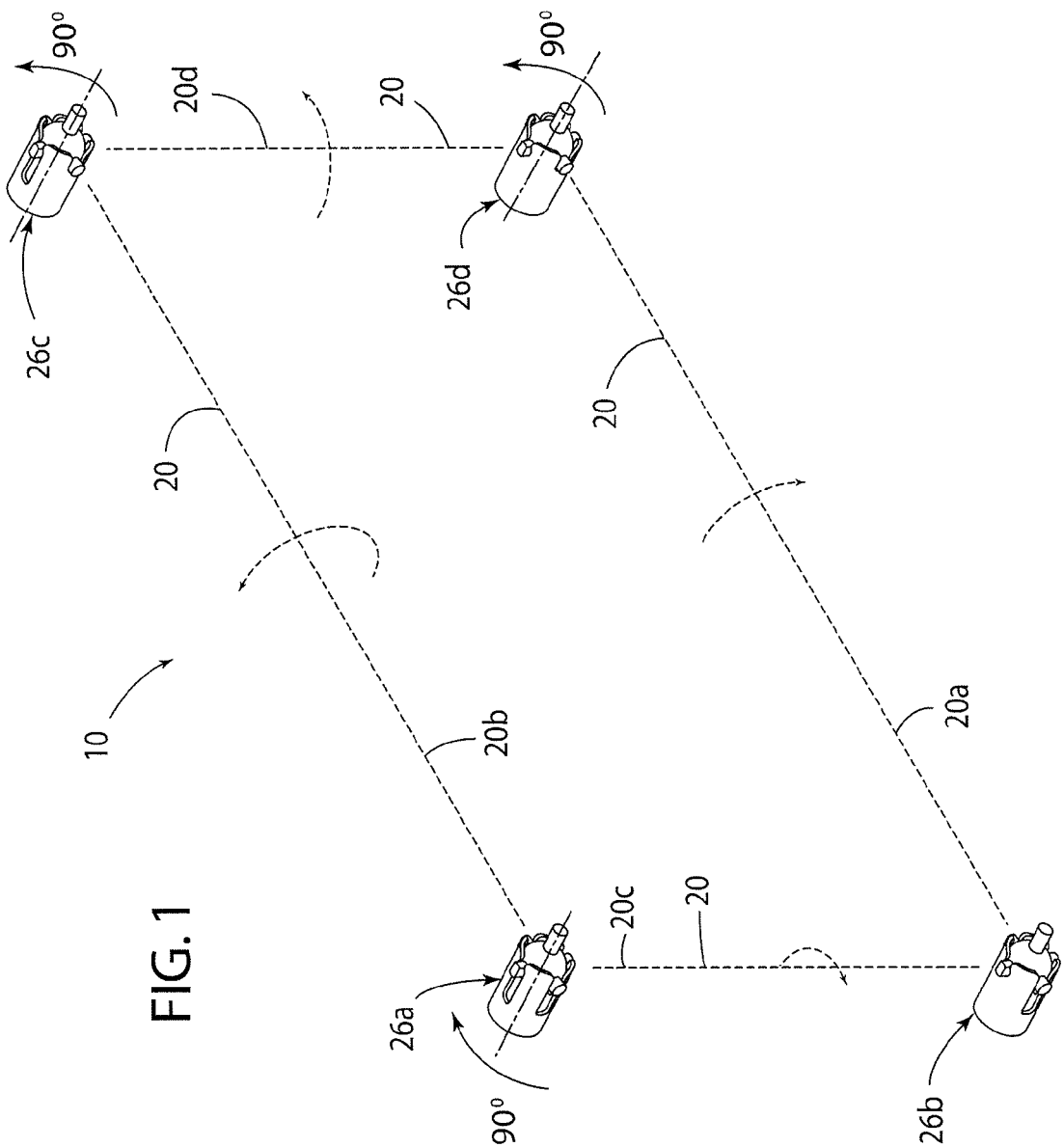

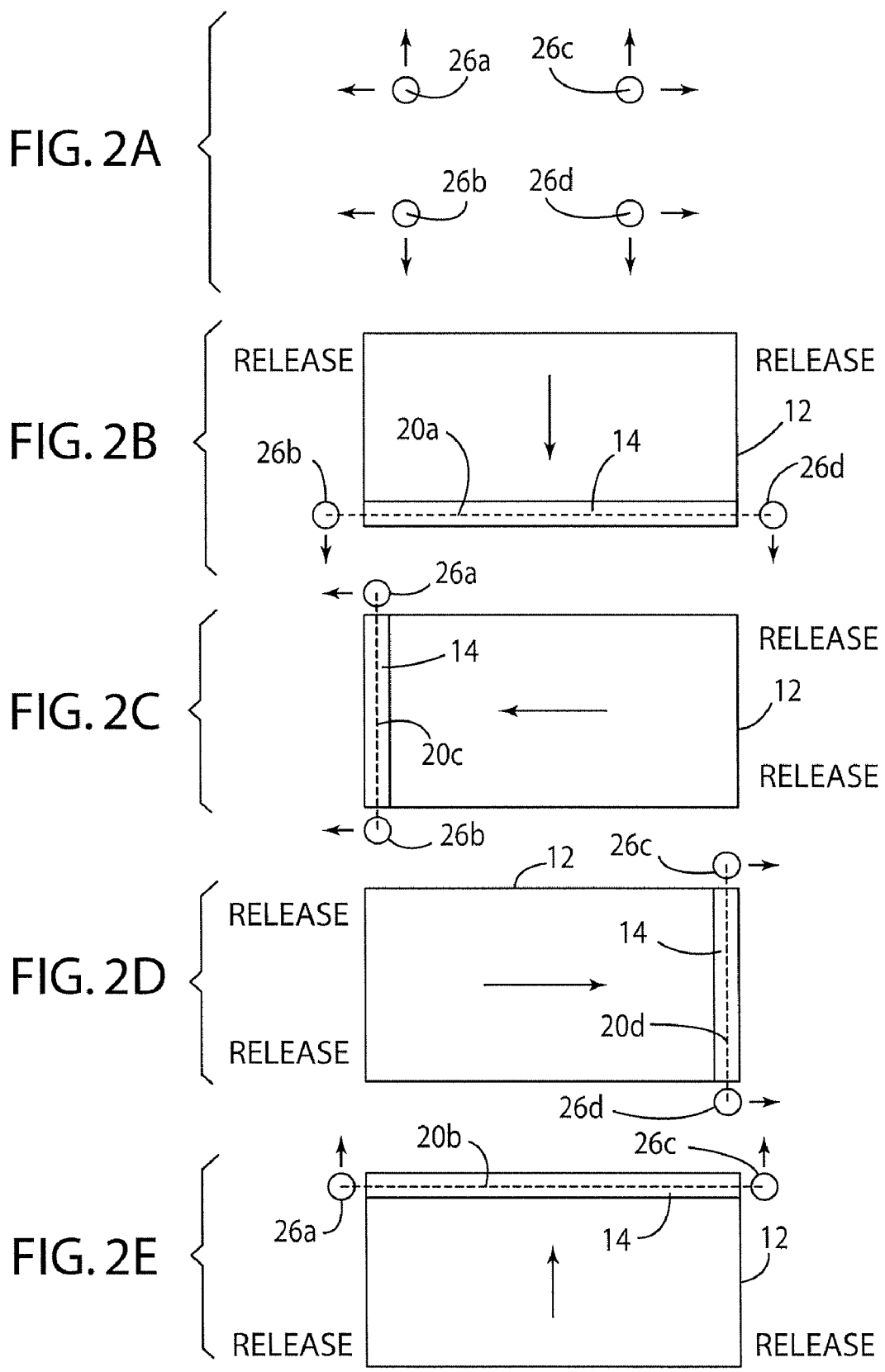

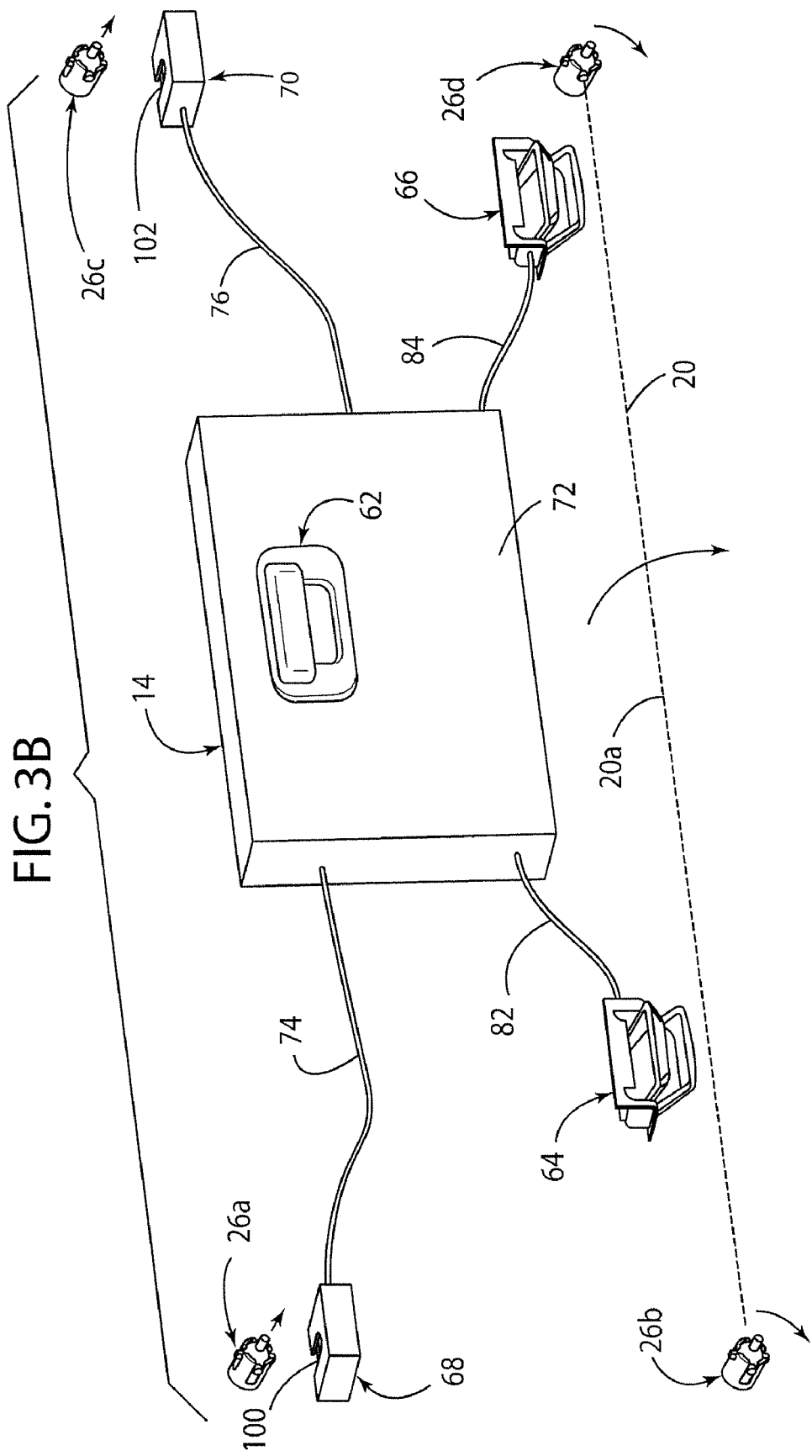

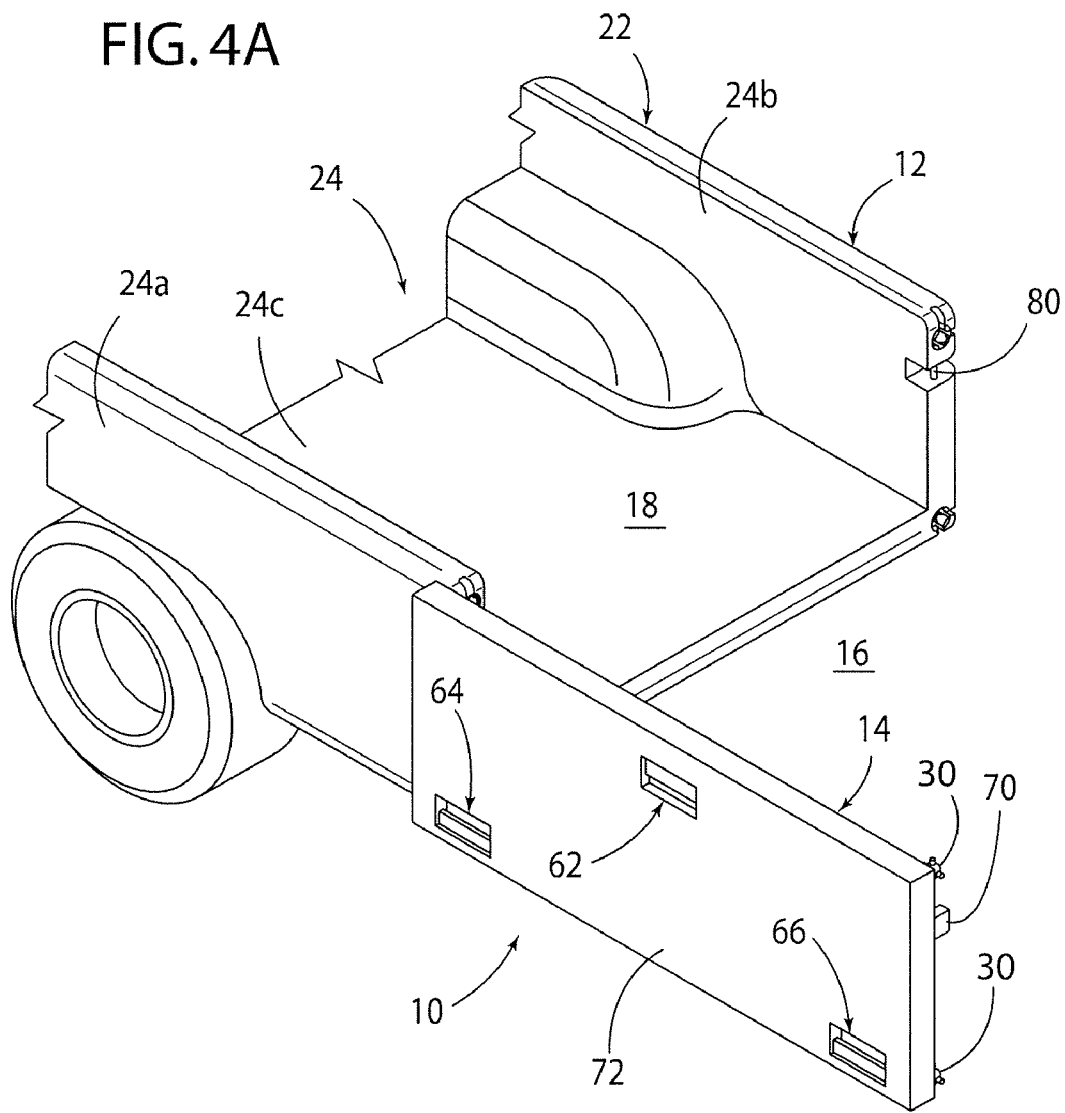

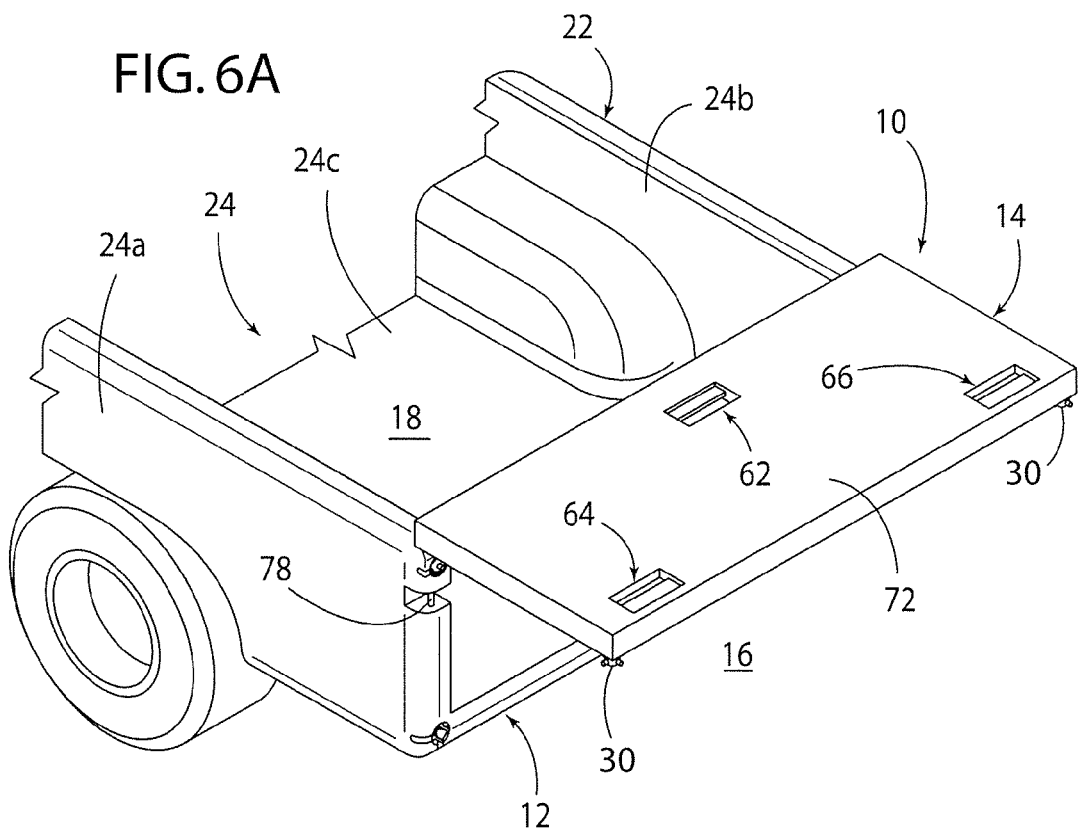

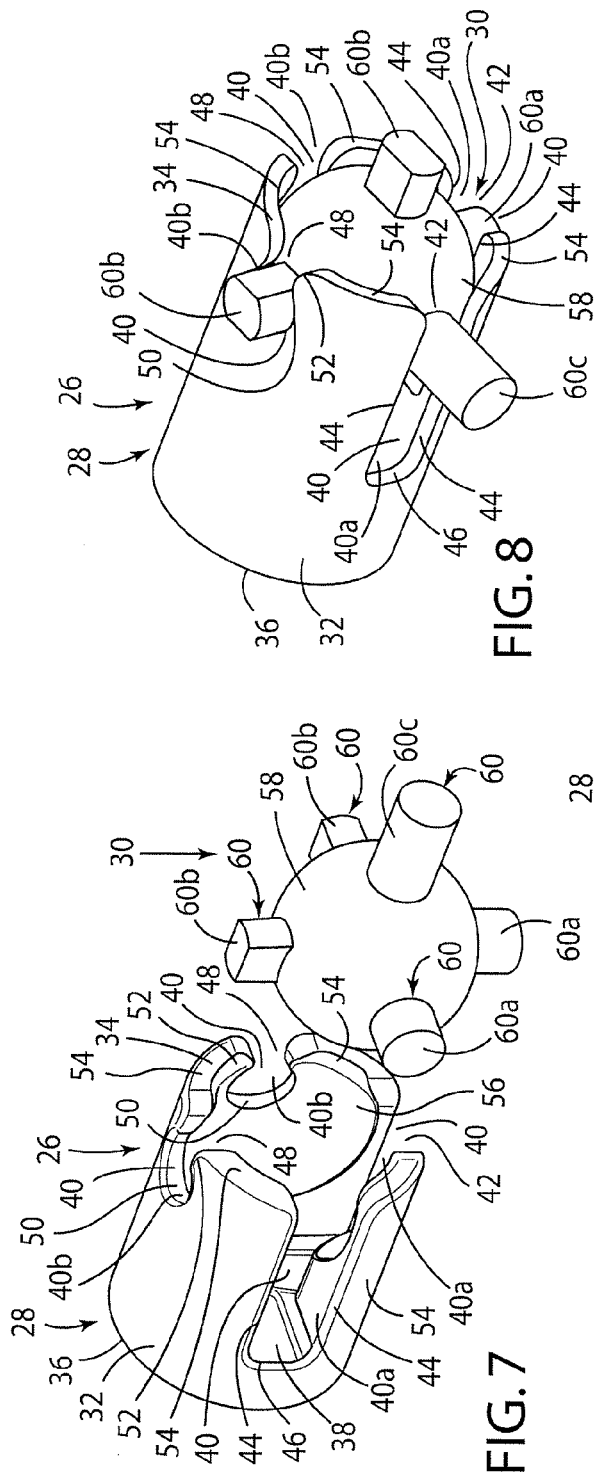
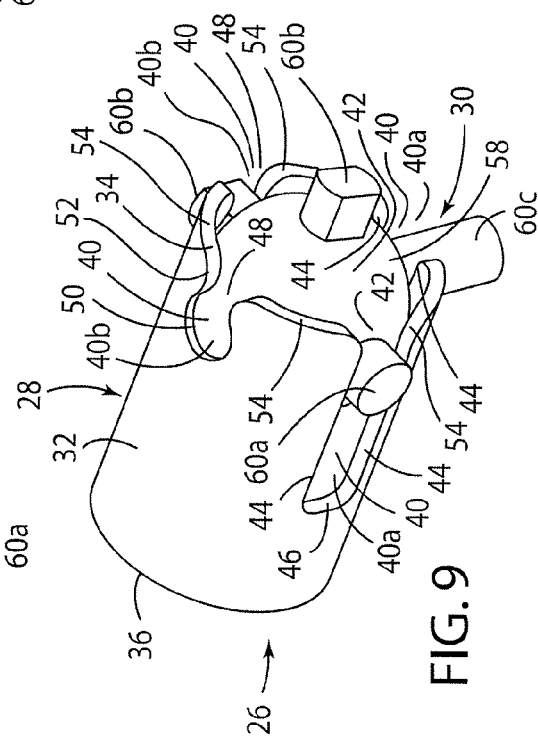
FIG. 7
FIG. 8
FIG. 9

US 8,061,753 B2

UNIVERSAL TAILGATE HINGE

FIELD OF THE INVENTION

The present invention concerns vehicles, and more particularly relates to a tailgate for a vehicle.

BACKGROUND OF THE INVENTION

Heretofore, tailgates for pick-up trucks have typically rotated about a lower axis of rotation for allowing the tailgate to be opened and closed.

SUMMARY OF THE PRESENT INVENTION

An aspect of the present invention is to provide a pick-up truck comprising a vehicle frame having a truck bed, with the truck bed including a first side bed wall, a second side bed wall and a bottom bed wall. The pick-up truck also includes a tailgate connected to the vehicle frame adjacent the truck bed, with the tailgate being removably connected to the truck bed of the vehicle frame. The tailgate is pivotable about the vehicle frame along at least two axes of rotation. The pick-up truck further includes at least three hinges connected to the vehicle frame and the tailgate for allowing the tailgate to pivot about the at least two axes of rotation. Each axis of rotation intersects at least one of the at least two axes of rotation at an intersection. One of the hinges is located at the intersection.

Another aspect of the present invention is to provide an entry assembly comprising a frame having a first side and a second side, a gate and hinges. The gate is connected to the frame, with the gate defining a demarcation between the first side and the second side of the frame. The gate is pivotable about the frame along four axes of rotation. The hinges are connected to the vehicle frame and the tailgate for allowing the tailgate to pivot about the four axes of rotation. Each axis of rotation intersects two other axes of rotation and the four axes of rotation form a rectangle such that each axis of rotation intersects a first one of the other axes of rotation at a first intersection point and a second one of the other axes of rotation at a second intersection point. One of the hinges is located at each intersection point.

Yet another aspect of the present invention is to provide a hinge comprising a hinge ball including two pairs of aligned posts, with each pair of aligned posts including a first post having a circular cross section and a second post having a non-circular cross section, and a ball receiver configured to removably receive the hinge ball, with the ball receiver comprising a cylinder having a plurality of slots. Each slot is configured to have one of the posts located therein. The hinge ball is configured to be rotated in the ball receiver along two orthogonal axes of rotation, each axis of rotation being aligned with one of the pairs of aligned posts. The hinge ball can be removed from the ball receiver when the hinge ball is not rotated. The hinge ball cannot be removed from the ball receiver once the hinge ball has been rotated about one of the axes of rotation.

These and other aspects, objects, and features of the present invention will be understood and appreciated by those skilled in the art upon studying the following specification, claims, and appended drawings.

BRIEF DESCRIPTION OF DRAWINGS

FIG. 1 is a schematic view of an entry assembly including four hinge assemblies showing rotational directions of a gate of the present invention.

FIG. 2A is a schematic view of the present invention showing rotational directions of hinges of the hinge assemblies of the present invention.

FIG. 2B is a schematic view of the gate of the present invention in a rotated downward position.

FIG. 2C is a schematic view of the gate of the present invention in a rotated to the left position.

FIG. 2D is a schematic view of the gate of the present invention in a rotated to the right position.

FIG. 2E is a schematic view of the gate of the present invention in a rotated upward position.

FIG. 3B is a schematic rear view of the tailgate and vehicle of the present invention, with the tailgate in the rotated downward position.

FIG. 4A is a partial rear perspective view of the tailgate and vehicle of the present invention, with the tailgate in the rotated to the left position.

FIG. 6A is a partial rear perspective view of the tailgate and vehicle of the present invention, with the tailgate in the rotated upward position.

FIG. 7 is an exploded perspective view of the hinge and hinge housing embodying the present invention.

FIG. 8 is a perspective view of the hinge and hinge housing embodying the present invention with the hinge rotated in a first orthogonal direction.

FIG. 9 is a perspective view of the hinge and hinge housing embodying the present invention with the hinge rotated in a second orthogonal direction.

DETAILED DESCRIPTION OF PREFERRED EMBODIMENTS

Figure 3A:
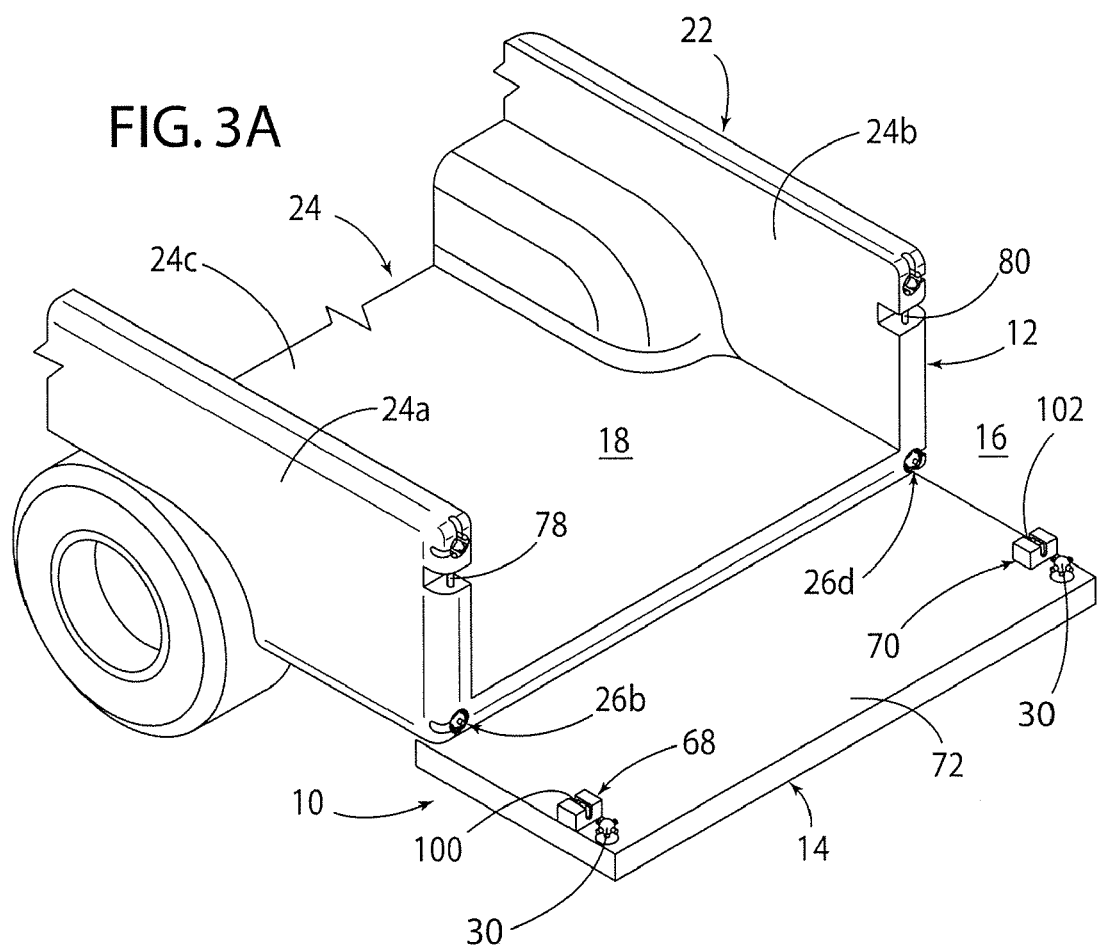
FIG. 3A is a partial rear perspective view of a tailgate and vehicle of the present invention, with the tailgate in the rotated downward position.

For purposes of description herein, the terms "upper," "lower," "right," "left," "rear," "front," "vertical," "horizontal," and derivatives thereof shall relate to the invention as orientated in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The reference number 10 (FIGS. 1-6B) generally designates an entry assembly of the present invention. The entry assembly 10 comprises a frame 12 and a gate 14. The frame 12 has a first side 16 and a second side 18 (see, e.g., FIG. 3A).

The gate 14 is connected to the frame 12. The gate 14 defines a demarcation between the first side 16 and the second side 18 of the frame 12. The gate 14 is pivotable about the frame 12 along at least two axes of rotation 20. Each axis of rotation 20 intersects at least one of the at least two axes of rotation 20.

In the present invention, the entry assembly 10 can be used in a vehicle. For example, the gate 14 of the entry assembly 10 can be a tailgate of a pick-up truck 22 (see FIGS. 3A, 4A, 5A and 6A), with the first side 16 of the frame 12 being an outside of the pick-up truck 22 and the second side 18 of the frame 12 being a bed 24 of the pick-up truck 22. The bed 24 includes a first side bed wall 24a, a second side bed wall 24b and a bottom bed wall 24c. However, the gate 14 can be any door or gate used anywhere having two, three, four (or possibly more) walls. For example, the gate 14 could be used on a trailer or any building structure. Moreover, the first side 16 of the frame 12 could be an outside of any structure or item and the second side 18 of the frame 12 could be an inside of any structure or item. Accordingly, while the entry assembly 10 is discussed herein as being used with the pick-up truck 22, the entry assembly 10 could be used in the same manner on any structure.

The illustrated entry assembly 10 includes the gate 14 that is pivotable about the frame 12 along at least two axes of rotation 20. FIG. 1 illustrates the axes of rotation 20 of the gate 14 about the frame 12. The axes of rotation 20 include a lower axis of rotation 20a, an upper axis of rotation 20b, a first side axis of rotation 20c and a second side axis of rotation 20d. As shown in FIG. 1, each axis of rotation 20 intersects two other of the axes of rotation 20. While FIG. 1 includes four axes of rotation 20, it is contemplated that the entry assembly 10 could include only two or three axes of rotation 20 (e.g., the lower axis of rotation 20a and the first side axis of rotation 20c or the lower axis of rotation 20a, the first side axis of rotation 20c and the second side axis of rotation 20d). Furthermore, if the entry assembly 10 includes two axes of rotation 20, each axis of rotation 20 will intersect only the other axis of rotation 20. Likewise, if the entry assembly 10 includes three axes of rotation 20, one of the axes of rotation 20 will intersect the two other axes of rotation 20, but the two other axes of rotation 20 will intersect only one other axis of rotation 20. The entry assembly 10 has a hinge assembly 26 (see FIGS. 7-9) at each intersection of the axes of rotation 20.

FIGS. 1-2E illustrate the axes of rotation 20 and movement of the gate 14 about the axes of rotation 20 along with the movement of each hinge assembly 26 as the gate 14 moves about each axis of rotation 20. As illustrated in FIG. 2A, the hinge assemblies 26 include a first side upper hinge assembly 26a, a first side lower hinge assembly 26b, a second side upper hinge assembly 26c and a second side lower hinge assembly 26d. As illustrated in FIG. 2A, the first side upper hinge assembly 26a is configured to rotate either upward or outward, the first side lower hinge assembly 26b is configured to rotate either downward or outward, the second side upper hinge assembly 26c is configured to rotate either upward or outward and the second side lower hinge assembly 26d is configured to rotate either downward or outward. Furthermore, each of the hinge assemblies 26 is configured to allow the gate 14 to be released from the frame 12.

Accordingly, as illustrated in FIG. 2B, the gate 14 can rotate about the lower axis of rotation 20a by having the first side upper hinge assembly 26a and the second side upper hinge assembly 26c release a top of the gate 14 from the frame 12 and by having the first side lower hinge assembly 26b and the second side lower hinge assembly 26d rotate downward, thereby allowing the gate 14 to rotate downward about the lower axis of rotation 20a. As illustrated in FIG. 2C, the gate 14 can rotate about the first side axis of rotation 20c by having the second side upper hinge assembly 26c and the second side lower hinge assembly 26d release a right side of the gate 14 from the frame 12 and by having the first side upper hinge assembly 26a and the first side lower hinge assembly 26b rotate outward, thereby allowing the gate 14 to rotate to the left about the first side axis of rotation 20c. As illustrated in FIG. 2D, the gate 14 can rotate about the second side axis of rotation 20d by having the first side upper hinge assembly 26a and the first side lower hinge assembly 26b release a left side of the gate 14 from the frame 12 and by having the second side upper hinge assembly 26c and the second side lower hinge assembly 26d rotate outward, thereby allowing the gate 14 to rotate to the right about the second side axis of rotation 20d. As illustrated in FIG. 2E, the gate 14 can rotate about the upper axis of rotation 20b by having the first side lower hinge assembly 26b and the second side lower hinge assembly 26d release a bottom of the gate 14 from the frame 12 and by having the first side upper hinge assembly 26a and the second side upper hinge assembly 26c rotate upward, thereby allowing the gate 14 to rotate upward about the upper axis of rotation 20b.

In the illustrated example, the hinge assemblies 26 (FIGS. 7-9) each include a hinge housing 28 and a hinge ball 30. In the illustrated example, the hinge housing 28 is configured to be connected to the frame 12 and the hinge ball 30 is configured to be connected to the gate 14. However, it is contemplated that the hinge housing 28 could be connected to the gate 14 and the hinge ball 30 could be connected to the frame 12. The hinge housing 28 accepts the hinge ball 30 therein. The hinge housing 28 comprises a cylinder 32 having a first end 34 and a second end 36. The cylinder 32 can include a rear wall 38 at the second end 36. However, it is contemplated that the cylinder 32 does not have to include the rear wall 38. The cylinder 32 includes four slots 40 extending into the cylinder 32 from the first end 34 thereof. The four slots 40 are each located at 90° of a circle of the first end 34 of the cylinder 32. The four slots 40 comprise a pair of adjacent elongated slots 40a and a pair of adjacent circular slots 40b. The pair of adjacent elongated slots 40a each has a mouth 42 at the first end 34 of the cylinder 32, a pair of substantially parallel side edges 44 and a bottom edge 46. The pair of adjacent circular slots 40b each has a mouth 48 at the first end 34 of the cylinder 32, a substantially circular bottom edge 50 and a constriction 52 between the mouth 48 and the substantially circular bottom edge 50. The four slots 40 define four arms 54 adjacent the first end 34 of the cylinder 32, with each adjacent slot 40 defining one arm 54 therebetween. The cylinder 32 also include a spherical inner surface 56 (see FIG. 7) adjacent the first end 34 of the cylinder 32, with the spherical inner surface 56 being configured to accept the hinge ball 30 thereon.

The illustrated hinge ball 30 of the hinge assembly 26 is configured to be inserted into the cylinder 32 of the hinge housing 28 to connect the hinge ball 30 to the hinge housing 28. The hinge ball 30 comprises a sphere 58 having five posts 60. The five posts 60 comprise a pair of circular posts 60a, a pair of non-circular posts 60b and a connection post 60c. The pair of circular posts 60a and the pair of non-circular posts 60b are located along a circumference of the sphere 58 at 90° intervals, with the pair of circular posts 60a being adjacent to each other and the pair of non-circular posts 60b being adjacent to each other. The connection post 60c extends from the sphere 58 along a line perpendicular to a plane including the pair of circular posts 60a and the pair of non-circular posts 60b (see FIG. 7). The connection post 60c is configured to be connected to the gate 14.

In the illustrated example, the hinge ball 30 is configured to be connected to the hinge housing 28 by pressing the sphere 58 against the first end 34 of the cylinder 32, with the connection post 60c facing outward as illustrated in FIG. 7. Furthermore, the pair of circular posts 60a should be aligned with the first of adjacent elongated slots 40a of the cylinder 32 such that the pair of circular posts 60a are located within the pair of adjacent elongated slots 40a of the cylinder 32 when the hinge ball 30 is connected to the hinge housing 28. Moreover, the pair of non-circular posts 60b should be aligned with the pair of adjacent circular slots 40b of the cylinder 32 such that the pair of non-circular posts 60b are located within the pair of adjacent circular slots 40b of the cylinder 32 when the hinge ball 30 is connected to the hinge housing 28. As the hinge ball 30 is pressed against the first end 34 of the cylinder 32, the arms 54 of the cylinder 32 will flex outward to allow the sphere 58 of the hinge ball 30 to enter the spherical inner surface 56 of the cylinder 32 of the hinge housing 28. After the sphere 58 of the hinge ball 30 is fully inserted into the spherical inner surface 56 of the cylinder 32 of the hinge housing 28, the arms 54 of the cylinder 32 will flex back to their original position, thereby capturing the sphere 58 of the hinge ball 30 within the cylinder 32 of the hinge housing 28 and connecting the hinge ball 30 to the hinge housing 28. It is contemplated that the ends of the arms 54 could be beveled to assist in forcing the arms 54 outward as the sphere 58 of the hinge ball 30 abuts the first end 34 of the cylinder 32.

In the illustrated embodiment, the four of the hinge balls 30 are configured to be fixedly connected to the gate 14 and four hinge housings 28 are configured to be located within the frame 12. The hinge balls 30 are connecting to the gate 14 by inserting the connection post 60c into a mating opening in the gate 14. However, it is contemplated that the connection post 60c could be replaced by any structure connecting the hinge balls 30 to the gate 14. While the gate 14 is closed, the hinge balls 30 are located with the hinge housings 28. However, as the gate 14 is moved to an open position (for example, one of the positions in FIG. 3A, 4A, 5A or 6A), two of the hinge balls 30 will be withdrawn from their associated hinge housing 28 and two of the hinge balls 30 will rotate with the gate 14.

FIGS. 3A and 3B illustrate the gate 14 rotating about the lower axis of rotation 20a. As illustrated in FIG. 3A, the hinge balls 30 of the first side upper hinge assembly 26a and the second side upper hinge assembly 26c are removed from their associated hinge housings 28. Furthermore, the hinge balls 30 of the first side lower hinge assembly 26b and the second side lower hinge assembly 26d rotate downward. FIG. 9 illustrates the first side lower hinge assembly 26b with the hinge ball 30 rotated downward. As shown in FIG. 9, when the hinge ball 30 is rotated downward, the connection post 60c moves through the mouth 42 of one of the elongated slots 40a at a bottom of the cylinder 32 of the hinge housing 28. Furthermore, the circular post 60a in the other elongated slot 40a will rotate about an axis of the circular post 60a. Likewise, the non-circular post 60b opposite the circular post 60a in the elongated slot 40a will also rotate. Since the non-circular post 60b is non-circular, rotation of the non-circular post 60b will prevent the non-circular post 60b from being able to be removed from the circular slot 40b receiving the non-circular post 60b because the constriction 52 will prevent removal of the non-circular post 60b (the long dimension of the non-circular post 60b will abut the constriction 52 to prevent its removal therefrom). However, the other non-circular post 60b will not be rotated and will be allowed to be withdrawn from the circular slot 40b because the non-circular post 60b in a non-rotated configuration can pass by the constriction 52 (the short dimension of the non-circular post 60b will not abut the constriction 52 to allow its removal therefrom).

In the illustrated example, the hinge ball 30 of the second side lower hinge assembly 26d will move in the same manner as the hinge ball 30 of the first side lower hinge assembly 26b, except that the cylinder 32 of the second side lower hinge assembly 26d is rotated 90° counter-clockwise (such that the elongated slots 40a are on a bottom and an outside of the cylinder 32) and the hinge ball 30 is rotated 90° counter-clockwise (such that when the gate 14 is closed, the non-circular posts 60b are located at a top and an inside of the hinge ball 30 and the circular posts 60a are located at a bottom and an outside of the hinge ball 30). Accordingly, when the hinge ball 30 is rotated downward, the connection post 60c moves through the mouth 42 of one of the elongated slots 40a at a bottom of the cylinder 32 of the hinge housing 28. Furthermore, the circular post 60a in the other elongated slot 40a will rotate about an axis of the circular post 60a. Likewise, the non-circular post 60b opposite the circular post 60a in the elongated slot 40a will also rotate. Since the non-circular post 60b is non-circular, rotation of the non-circular post 60b will prevent the non-circular post 60b from being able to be removed from the circular slot 40b receiving the non-circular post 60b because the constriction 52 will prevent removal of the non-circular post 60b (the long dimension of the non-circular post 60b will abut the constriction 52 to prevent its removal therefrom). However, the other non-circular post 60b will not be rotated and will be allowed to be withdrawn from the circular slot 40b because the non-circular post 60b in a non-rotated configuration can pass by the constriction 52 (the short dimension of the non-circular post 60b will not abut the constriction 52 to allow its removal therefrom).

The illustrated gate 14 will then be allowed to rotate about the lower axis of rotation 20a and the non-circular posts 60b in the rotated positions will prevent the hinge balls 30 from being removed from the hinge housings 28, thereby keeping the gate 14 connected to the frame 12 via the first side lower hinge assembly 26b and the second side lower hinge assembly 26d.

FIG. 3B illustrates an embodiment of the gate 14 that allows the gate 14 to rotate about the lower axis of rotation 20a as illustrated in FIG. 3A. In the illustrated example, the gate 14 can include a center handle 62, a lower first side handle 64 and a lower second side handle 66. The gate 14 also includes a first side latch assembly 68 and a second side latch assembly 70. Although only the center handle 62 is shown as being within a gate housing 72, it is understood that the lower first side handle 64, the lower second side handle 66, the first side latch assembly 68 and the second side latch assembly 70 would also be within or connected to the gate housing 72 as illustrated in FIG. 3A. The lower first side handle 64, the lower second side handle 66, the first side latch assembly 68 and the second side latch assembly 70 are not shown within or connected to the gate housing 72 in FIG. 3B for illustrative purposes only and to show the working elements with the gate housing 72. The center handle 62 is configured to be connected to the first side latch assembly 68 and the second side latch assembly 70 via a first upper cord sleeve 74 and a second upper cord sleeve 76, respectively. The first side latch assembly 68 includes a latch (not shown) configured to engage a first side striker 78 (see FIG. 3A) in the frame 12 and the second side latch assembly 70 includes a latch (not shown) configured to engage a second side striker 80 (see FIG. 3A) in the frame 12 to maintain the gate 14 in the closed position. By pulling the center handle 62, the first side latch assembly 68 is activated and the second side latch assembly 70 is activated to disengage their latches from the first side striker 78 and the second side striker 80 in a manner that is well known to those skilled in the art. The first side latch assembly 68 and the second side latch assembly 70 can be activated mechanically or electronically via the first upper cord sleeve 74 and the second upper cord sleeve 76, respectively, as is well known to those skilled in the art. It is also contemplated that the first side latch assembly 68 and the second side latch assembly 70 could alternatively be wirelessly connected to the center handle 62.

As illustrated in FIGS. 3A and 3B, once the center handle 62 is pulled, the gate 14 can rotate about the lower axis of rotation 20*a*. As the center handle 62 is pulled, the first side latch assembly 68 disengages from the first side striker 78 and the second side latch assembly 70 disengages from the second side striker 80. Furthermore, the arms 54 of the cylinder 32 of the hinge housing 28 of the first side upper hinge assembly 26*a* and the second side upper hinge assembly 26*c* will expand, thereby allowing the hinge balls 30 of the first side upper hinge assembly 26*a* and the second side upper hinge assembly 26*c* to be removed from the hinge housings 28 of the first side upper hinge assembly 26*a* and the second side upper hinge assembly 26*c*. The gate 14 is then allowed to rotate about the lower axis of rotation 20*a* as illustrated in FIG. 3A.

Figure 4B:
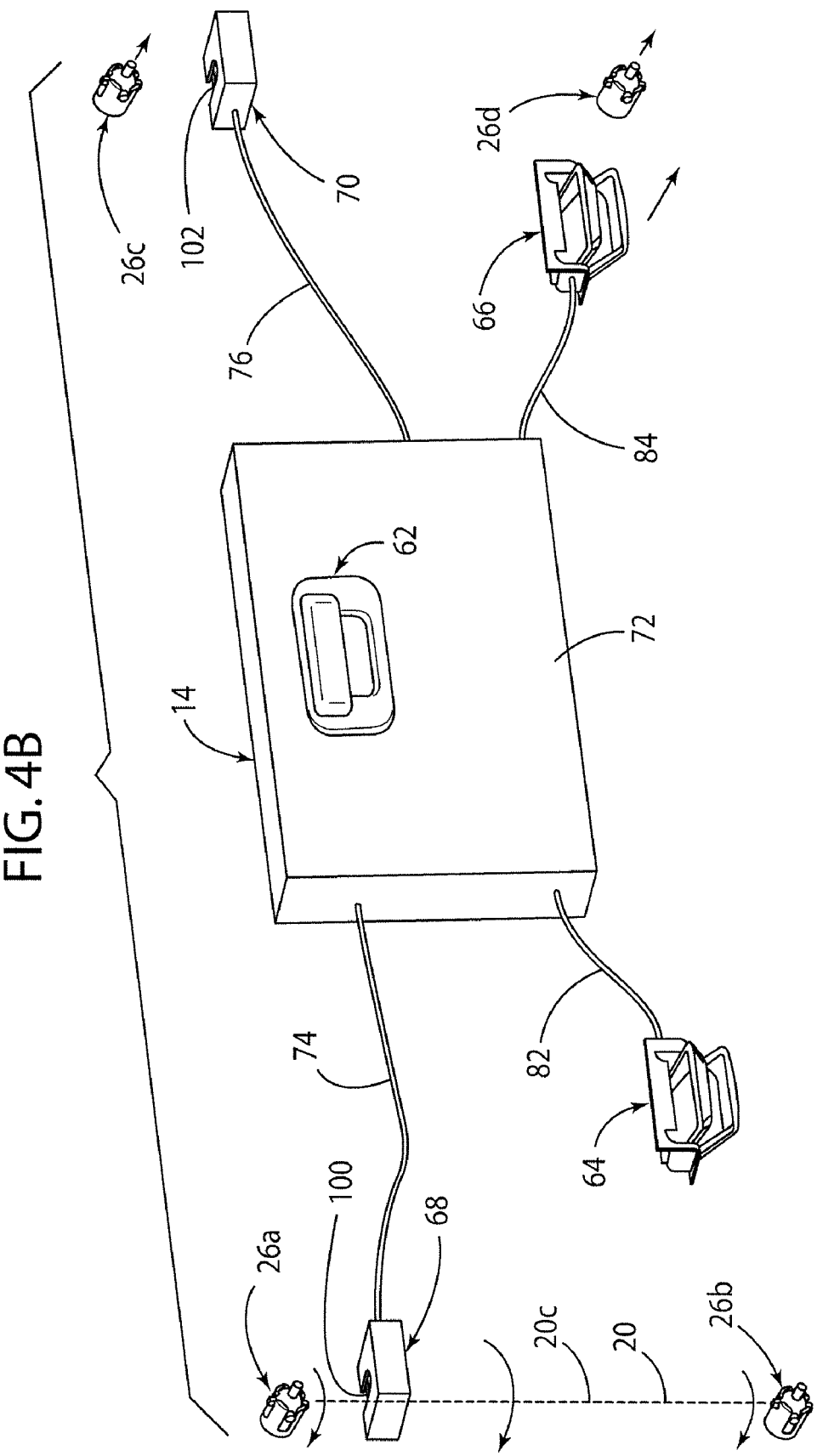
FIG. 4B is a schematic rear view of the tailgate and vehicle of the present invention, with the tailgate in the rotated to the left position.

FIGS. 4A and 4B illustrate the gate 14 rotating about the first side axis of rotation 20*c*. As illustrated in FIG. 4A, the hinge balls 30 of the second side upper hinge assembly 26*c* and the second side lower hinge assembly 26*d* are removed from their associated hinge housings 28. Furthermore, the hinge balls 30 of the first side upper hinge assembly 26*a* and the first side lower hinge assembly 26*b* rotate outward or to the side. FIG. 8 illustrates hinge ball 30 of the first side lower hinge assembly 26*b* rotating outward or to the side. As shown in FIG. 8, when the hinge ball 30 is rotated outward or to the side, the connection post 60*c* moves through the mouth 42 of one of the elongated slots 40*a* at a side of the cylinder 32 of the hinge housing 28. Furthermore, the circular post 60*a* in the other elongated slot 40*a* will rotate about an axis of the circular post 60*a*. Likewise, the non-circular post 60*b* opposite the circular post 60*a* in the elongated slot 40*a* will also rotate. Since the non-circular post 60*b* is non-circular, rotation of the non-circular post 60*b* will prevent the non-circular post 60*b* from being able to be removed from the circular slot 40*b* receiving the non-circular post 60*b* because the constriction 52 will prevent removal of the non-circular post 60*b* (the long dimension of the non-circular post 60*b* will abut the constriction 52 to prevent its removal therefrom). However, the other non-circular post 60*b* will not be rotated and will be allowed to be withdrawn from the circular slot 40*b* because the non-circular post 60*b* in a non-rotated configuration can pass by the constriction 52 (the short dimension of the non-circular post 60*b* will not abut the constriction 52 to allow its removal therefrom).

In the illustrated example, the hinge ball 30 of the first side upper hinge assembly 26*a* will move in the same manner as the hinge ball 30 of the first side lower hinge assembly 26*b*, except that the cylinder 32 of the first side upper hinge assembly 26*a* is rotated 90° clockwise (such that the elongated slots 40*a* are on a top and an outside of the cylinder 32) and the hinge ball 30 is rotated 90° clockwise (such that when the gate 14 is closed, the non-circular posts 60*b* are located at a bottom and an inside of the hinge ball 30 and the circular posts 60*a* are located at a top and an outside of the hinge ball 30). Accordingly, when the hinge ball 30 is rotated outward or to the side, the connection post 60*c* moves through the mouth 42 of one of the elongated slots 40*a* at a side of the cylinder 32 of the hinge housing 28. Furthermore, the circular post 60*a* in the other elongated slot 40*a* will rotate about an axis of the circular post 60*a*. Likewise, the non-circular post 60*b* opposite the circular post 60*a* in the elongated slot 40*a* will also rotate. Since the non-circular post 60*b* is non-circular, rotation of the non-circular post 60*b* will prevent the non-circular post 60*b* from being able to be removed from the circular slot 40*b* receiving the non-circular post 60*b* because the constriction 52 will prevent removal of the non-circular post 60*b* (the long dimension of the non-circular post 60*b* will abut the constriction 52 to prevent its removal therefrom). However, the other non-circular post 60*b* will not be rotated and will be allowed to be withdrawn from the circular slot 40*b* because the non-circular post 60*b* in a non-rotated configuration can pass by the constriction 52 (the short dimension of the non-circular post 60*b* will not abut the constriction 52 to allow its removal therefrom).

Accordingly, the gate 14 will be allowed to rotate about the first side axis of rotation 20*c* and the non-circular posts 60*b* in the rotated positions will prevent the hinge balls 30 from being removed from the hinge housings 28, thereby keeping the gate 14 connected to the frame 12 via the first side upper hinge assembly 26*a* and the first side lower hinge assembly 26*b*. Furthermore, the first side latch assembly 68 will assist in allowing the gate 14 to rotate about the first side axis of rotation 20*c* and in keeping the gate 14 connected to the frame 12 as discussed in more detail below.

FIG. 4B illustrates an embodiment of the gate 14 that allows the gate 14 to rotate about the first side axis of rotation 20*c* as illustrated in FIG. 4A. In the illustrated example, the gate 14 can include the center handle 62, the lower first side handle 64 and the lower second side handle 66. The gate 14 also includes the first side latch assembly 68 and the second side latch assembly 70. Although only the center handle 62 is shown as being within the gate housing 72, it is understood that the lower first side handle 64, the lower second side handle 66, the first side latch assembly 68 and the second side latch assembly 70 would also be within or connected to the gate housing 72 as illustrated in FIG. 4A. The lower first side handle 64, the lower second side handle 66, the first side latch assembly 68 and the second side latch assembly 70 are not shown within or connected to the gate housing 72 in FIG. 4B for illustrative purposes only and to show the working elements with the gate housing 72. In the illustrated example, the lower second side handle 66 is configured to be connected to the second side latch assembly 70 via a second lower cord sleeve 84 and the second upper cord sleeve 76. By pulling the lower second side handle 66, the second side latch assembly 70 is activated to disengage its latch from the second side striker 80 in a manner that is well known to those skilled in the art. The second side latch assembly 70 can be activated mechanically or electronically via the second lower cord sleeve 84 and the second upper cord sleeve 76 as is well known to those skilled in the art. It is also contemplated that the second side latch assembly 70 could alternatively be wirelessly connected to the lower first side handle 64.

As illustrated in FIGS. 4A and 4B, once the lower second side handle 66 is pulled, the gate 14 can rotate about the first side axis of rotation 20*c*. As the lower second side handle 66 is pulled, the second side latch assembly 70 disengages from the second side striker 80. Furthermore, the arms 54 of the cylinder 32 of the hinge housing 28 of the second side upper hinge assembly 26*c* and the second side lower hinge assembly 26*d* will expand, thereby allowing the hinge balls 30 of the second side upper hinge assembly 26*c* and the second side lower hinge assembly 26*d* to be removed from the hinge housings 28 of the second side upper hinge assembly 26*c* and the second side lower hinge assembly 26*d*. The gate 14 is then allowed to rotate about the first side axis of rotation 20*c* as illustrated in FIG. 4A. Moreover, the first side latch assembly 68 includes a first side slot 100 configured to receive the first side striker 78 therein. The first side axis of rotation 20*c* extends through the first side slot 100 and the first side striker 78 such that the first side latch assembly 68 assists in allowing the gate 14 to rotate about the first side axis of rotation 20*c* and in keeping the gate 14 connected to the frame 12 during rotation of the gate 14 about the first side axis of rotation 20*c*.

Figure 5A:
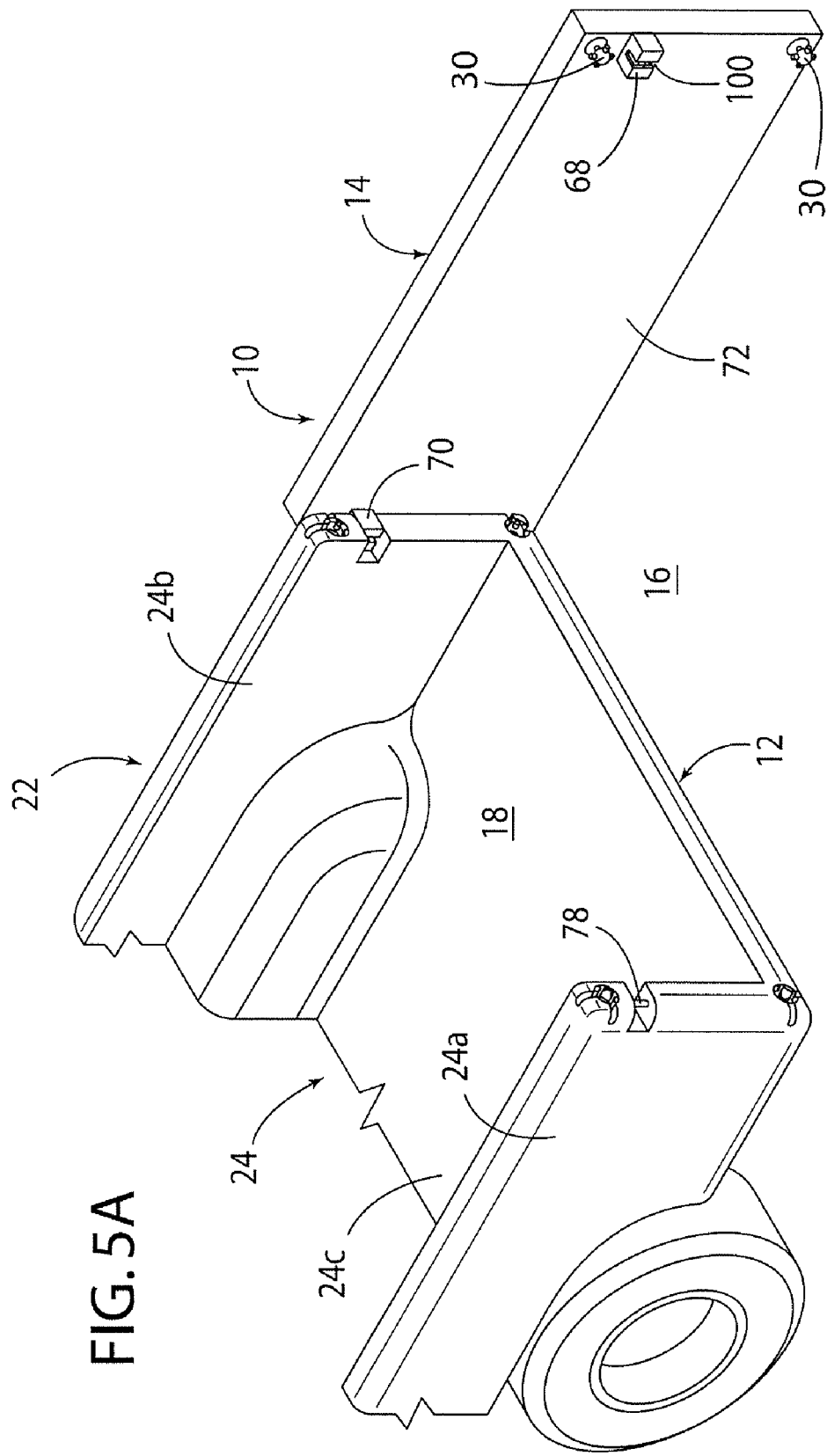
FIG. 5A is a partial rear perspective view of the tailgate and vehicle of the present invention, with the tailgate in the rotated to the right position.
Figure 5B:
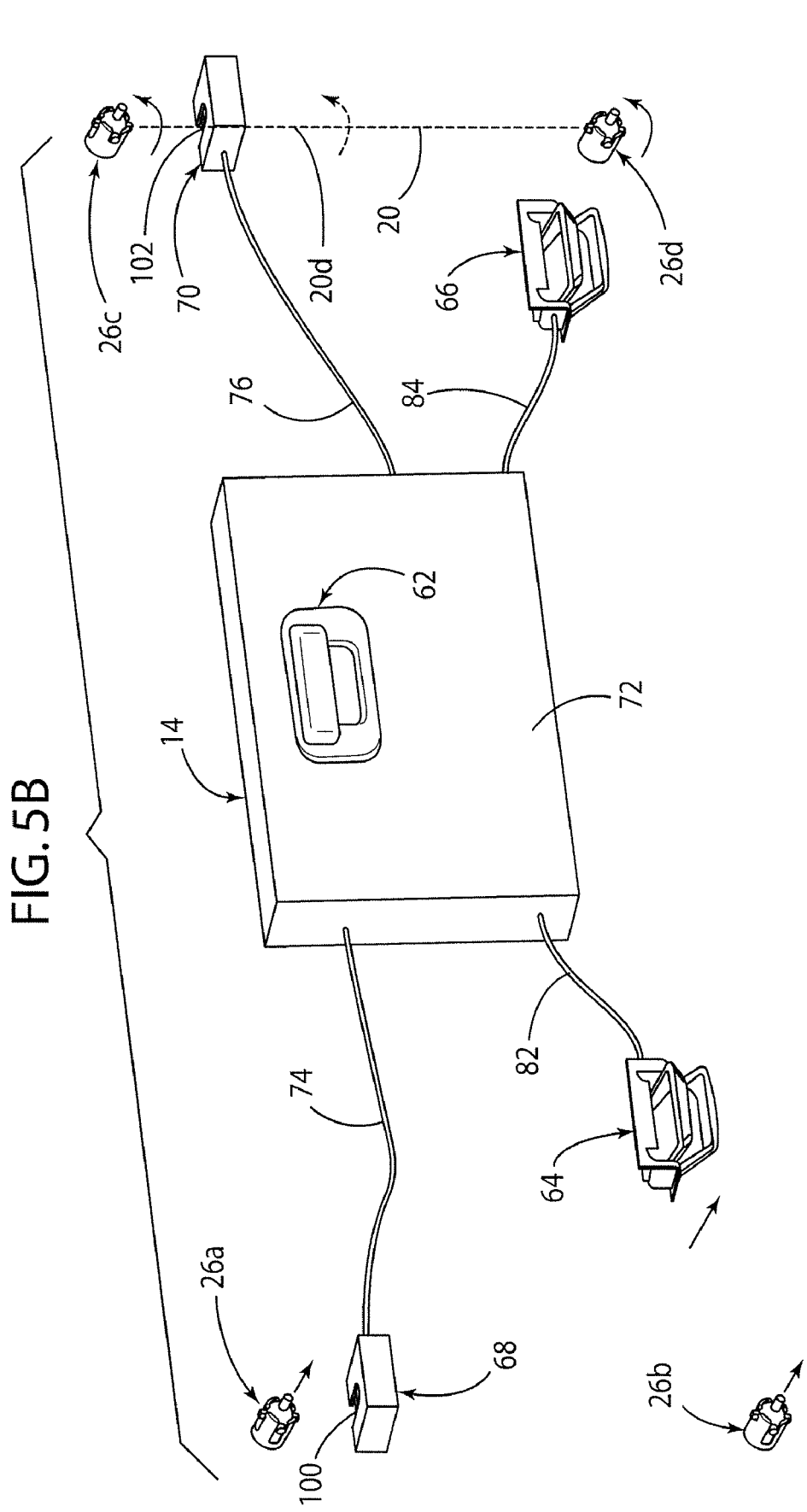
FIG. 5B is a schematic rear view of the tailgate and vehicle of the present invention, with the tailgate in the rotated to the right position.

FIGS. 5A and 5B illustrate the gate 14 rotating about the second side axis of rotation 20*d* in a manner similar, but opposite to that illustrated in FIGS. 4A and 4B. As illustrated in FIG. 5A, the hinge balls 30 of the first side upper hinge assembly 26*a* and the first side lower hinge assembly 26*b* are removed from their associated hinge housings 28. Furthermore, the hinge balls 30 of the second side upper hinge assembly 26*c* and the second side lower hinge assembly 26*d* rotate outward or to the side. As discussed above, the cylinder 32 of the second side lower hinge assembly 26*d* is rotated 90° counter-clockwise and the hinge ball 30 is rotated 90° counter-clockwise relative to the cylinder 32 and hinge ball 30 as illustrated in FIG. 7. Accordingly, when the hinge ball 30 is rotated outward or to the side, the connection post 60*c* moves through the mouth 42 of one of the elongated slots 40*a* at a side of the cylinder 32 of the hinge housing 28. Furthermore, the circular post 60*a* in the other elongated slot 40*a* will rotate about an axis of the circular post 60*a*. Likewise, the non-circular post 60*b* opposite the circular post 60*a* in the elongated slot 40*a* will also rotate. Since the non-circular post 60*b* is non-circular, rotation of the non-circular post 60*b* will prevent the non-circular post 60*b* from being able to be removed from the circular slot 40*b* receiving the non-circular post 60*b* because the constriction 52 will prevent removal of the non-circular post 60*b* (the long dimension of the non-circular post 60*b* will abut the constriction 52 to prevent its removal therefrom). However, the other non-circular post 60*b* will not be rotated and will be allowed to be withdrawn from the circular slot 40*b* because the non-circular post 60*b* in a non-rotated configuration can pass by the constriction 52 (the short dimension of the non-circular post 60*b* will not abut the constriction 52 to allow its removal therefrom).

In the illustrated example, the hinge ball 30 of the second side upper hinge assembly 26*c* will move in the same manner as the hinge ball 30 of the second side lower hinge assembly 26*d*, except that the cylinder 32 and the hinge ball 30 of the second side upper hinge assembly 26*c* are rotated 180° relative to the cylinder 32 and the hinge ball 30 as illustrated in FIG. 7 (such that the elongated slots 40*a* are on a top and an outside of the cylinder 32 and that, when the gate 14 is closed, the non-circular posts 60*b* are located at a bottom and an inside of the hinge ball 30 and the circular posts 60*a* are located at a top and an outside of the hinge ball 30). Accordingly, when the hinge ball 30 is rotated outward or to the side, the connection post 60*c* moves through the mouth 42 of one of the elongated slots 40*a* at a side of the cylinder 32 of the hinge housing 28. Furthermore, the circular post 60*a* in the other elongated slot 40*a* will rotate about an axis of the circular post 60*a*. Likewise, the non-circular post 60*b* opposite the circular post 60*a* in the elongated slot 40*a* will also rotate. Since the non-circular post 60*b* is non-circular, rotation of the non-circular post 60*b* will prevent the non-circular post 60*b* from being able to be removed from the circular slot 40*b* receiving the non-circular post 60*b* because the constriction 52 will prevent removal of the non-circular post 60*b* (the long dimension of the non-circular post 60*b* will abut the constriction 52 to prevent its removal therefrom). However, the other non-circular post 60*b* will not be rotated and will be allowed to be withdrawn from the circular slot 40*b* because the non-circular post 60*b* in a non-rotated configuration can pass by the constriction 52 (the short dimension of the non-circular post 60*b* will not abut the constriction 52 to allow its removal therefrom).

Accordingly, the gate 14 will be allowed to rotate about the second side axis of rotation 20*d* and the non-circular posts 60*b* in the rotated positions will prevent the hinge balls 30 from being removed from the hinge housings 28, thereby keeping the gate 14 connected to the frame 12 via the second side upper hinge assembly 26*c* and the second side lower hinge assembly 26*d*. Furthermore, the second side latch assembly 70 will assist in allowing the gate 14 to rotate about the second side axis of rotation 20*d* and in keeping the gate 14 connected to the frame 12 as discussed in more detail below.

FIG. 5B illustrates an embodiment of the gate 14 that allows the gate 14 to rotate about the second side axis of rotation 20*d* as illustrated in FIG. 5A. In the illustrated example, the gate 14 can include the center handle 62, the lower first side handle 64 and the lower second side handle 66. The gate 14 also includes the first side latch assembly 68 and the second side latch assembly 70. Although only the center handle 62 is shown as being within the gate housing 72, it is understood that the lower first side handle 64, the lower second side handle 66, the first side latch assembly 68 and the second side latch assembly 70 would also be within or connected to the gate housing 72 as illustrated in FIG. 5A. The lower first side handle 64, the lower second side handle 66, the first side latch assembly 68 and the second side latch assembly 70 are not shown within or connected to the gate housing 72 in FIG. 5B for illustrative purposes only and to show the working elements with the gate housing 72. In the illustrated example, the lower first side handle 64 is configured to be connected to the first side latch assembly 68 via a first lower cord sleeve 82 and the first upper cord sleeve 74. By pulling the lower first side handle 64, the first side latch assembly 68 is activated to disengage its latch from the first side striker 78 in a manner that is well known to those skilled in the art. The first side latch assembly 68 can be activated mechanically or electronically via the first lower cord sleeve 82 and the first upper cord sleeve 74 as is well known to those skilled in the art. It is also contemplated that the first side latch assembly 68 could alternatively be wirelessly connected to the lower second side handle 66.

As illustrated in FIGS. 5A and 5B, once the lower first side handle 64 is pulled, the gate 14 can rotate about the second side axis of rotation 20*d*. As the lower first side handle 64 is pulled, the first side latch assembly 68 disengages from the first side striker 78. Furthermore, the arms 54 of the cylinder 32 of the hinge housing 28 of the first side upper hinge assembly 26*a* and the first side lower hinge assembly 26*b* will expand, thereby allowing the hinge balls 30 of the first side upper hinge assembly 26*a* and the first side lower hinge assembly 26*b* to be removed from the hinge housings 28 of the first side upper hinge assembly 26*a* and the first side lower hinge assembly 26*b*. The gate 14 is then allowed to rotate about the second side axis of rotation 20*d* as illustrated in FIG. 5A. Moreover, the second side latch assembly 70 includes a second side slot 102 configured to receive the second side striker 80 therein. The second side axis of rotation 20*d* extends through the second side slot 102 and the second side striker 80 such that the second side latch assembly 70 assists in allowing the gate 14 to rotate about the second side axis of rotation 20*d* and in keeping the gate 14 connected to the frame 12 during rotation of the gate 14 about the second side axis of rotation 20*d*.

Figure 6B:
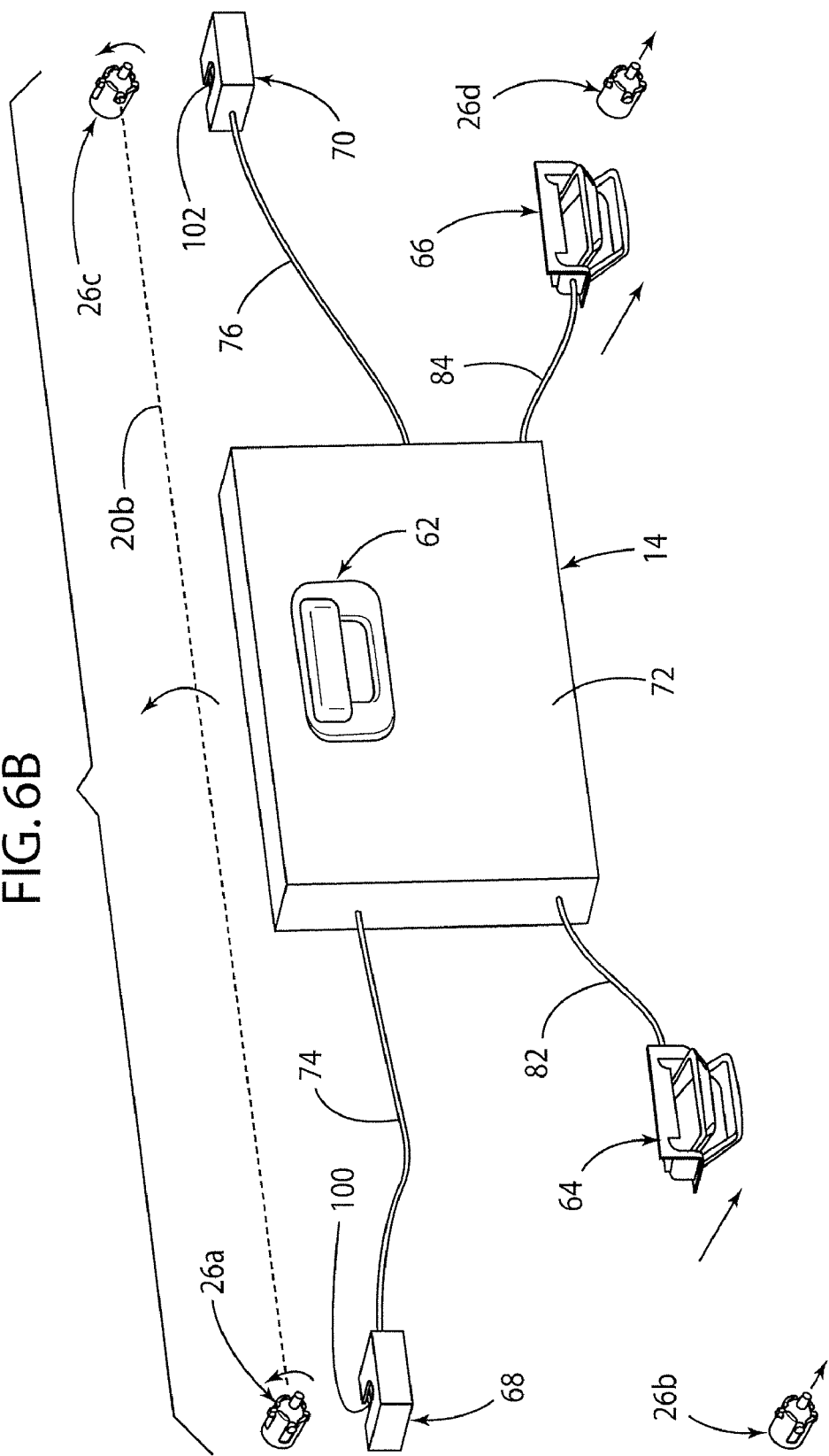
FIG. 6B is a schematic rear view of the tailgate and vehicle of the present invention, with the tailgate in the rotated upward position.

FIGS. 6A and 6B illustrate the gate 14 rotating about the upper axis of rotation 20b in a manner similar, but opposite to that illustrated in FIGS. 3A and 3B. As illustrated in FIG. 6A, the hinge balls 30 of the first side lower hinge assembly 26b and the second side lower hinge assembly 26d are removed from their associated hinge housings 28. Furthermore, the hinge balls 30 of the first side upper hinge assembly 26a and the second side upper hinge assembly 26c rotate upward. As discussed above, the cylinder 32 of the first side upper hinge assembly 26a is rotated 90° clockwise and the hinge ball 30 is rotated 90° clockwise relative to the cylinder 32 and hinge ball 30 as illustrated in FIG. 7. Accordingly, when the hinge ball 30 is rotated upward, the connection post 60c moves through the mouth 42 of one of the elongated slots 40a at a side of the cylinder 32 of the hinge housing 28. Furthermore, the circular post 60a in the other elongated slot 40a will rotate about an axis of the circular post 60a. Likewise, the non-circular post 60b opposite the circular post 60a in the elongated slot 40a will also rotate. Since the non-circular post 60b is non-circular, rotation of the non-circular post 60b will prevent the non-circular post 60b from being able to be removed from the circular slot 40b receiving the non-circular post 60b because the constriction 52 will prevent removal of the non-circular post 60b (the long dimension of the non-circular post 60b will abut the constriction 52 to prevent its removal therefrom). However, the other non-circular post 60b will not be rotated and will be allowed to be withdrawn from the circular slot 40b because the non-circular post 60b in a non-rotated configuration can pass by the constriction 52 (the short dimension of the non-circular post 60b will not abut the constriction 52 to allow its removal therefrom).

In the illustrated example, the hinge ball 30 of the second side upper hinge assembly 26c will move in the same manner as the hinge ball 30 of the first side upper hinge assembly 26a. As discussed above, the cylinder 32 of the second side upper hinge assembly 26c is rotated 180° and the hinge ball 30 is rotated 180° relative to the cylinder 32 and hinge ball 30 as illustrated in FIG. 7. Accordingly, when the hinge ball 30 is rotated upward, the connection post 60c moves through the mouth 42 of one of the elongated slots 40a at a side of the cylinder 32 of the hinge housing 28. Furthermore, the circular post 60a in the other elongated slot 40a will rotate about an axis of the circular post 60a. Likewise, the non-circular post 60b opposite the circular post 60a in the elongated slot 40a will also rotate. Since the non-circular post 60b is non-circular, rotation of the non-circular post 60b will prevent the non-circular post 60b from being able to be removed from the circular slot 40b receiving the non-circular post 60b because the constriction 52 will prevent removal of the non-circular post 60b (the long dimension of the non-circular post 60b will abut the constriction 52 to prevent its removal therefrom). However, the other non-circular post 60b will not be rotated and will be allowed to be withdrawn from the circular slot 40b because the non-circular post 60b in a non-rotated configuration can pass by the constriction 52 (the short dimension of the non-circular post 60b will not abut the constriction 52 to allow its removal therefrom).

Accordingly, the gate 14 will be allowed to rotate about the upper axis of rotation 20b and the non-circular posts 60b in the rotated positions will prevent the hinge balls 30 from being removed from the hinge housings 28, thereby keeping the gate 14 connected to the frame 12 via the first side upper hinge assembly 26a and the second side upper hinge assembly 26c. Furthermore, the second side latch assembly 70 will assist in allowing the gate 14 to rotate about the upper axis of rotation 20b and in keeping the gate 14 connected to the frame 12 as discussed in more detail below.

FIG. 6B illustrates an embodiment of the gate 14 that allows the gate 14 to rotate about the upper axis of rotation 20b as illustrated in FIG. 6A. In the illustrated example, the gate 14 can include the center handle 62, the lower first side handle 64 and the lower second side handle 66. The gate 14 also includes the first side latch assembly 68 and the second side latch assembly 70. Although only the center handle 62 is shown as being within the gate housing 72, it is understood that the lower first side handle 64, the lower second side handle 66, the first side latch assembly 68 and the second side latch assembly 70 would also be within or connected to the gate housing 72 as illustrated in FIG. 6A. The lower first side handle 64, the lower second side handle 66, the first side latch assembly 68 and the second side latch assembly 70 are not shown within or connected to the gate housing 72 in FIG. 6B for illustrative purposes only and to show the working elements with the gate housing 72. In the illustrated example, the lower first side handle 64 is configured to activate the first side latch assembly 68, the lower second side handle 66 is configured to activate the second side latch assembly 70, and the center handle 62 is configured to activate the first side latch assembly 68 and the second side latch assembly 70 as discussed above.

As illustrated in FIGS. 6A and 6B, once the lower first side handle 64 and the lower second side handle 66 is pulled or the center handle 62 is pulled, the gate 14 can rotate about the upper axis of rotation 20b. As the lower first side handle 64 and the lower second side handle 66 are pulled or the center handle 62 is pulled, the first side latch assembly 68 disengages from the first side striker 78 and the second side latch assembly 70 disengages from the second side striker 80. Furthermore, the arms 54 of the cylinder 32 of the hinge housing 28 of the first side lower hinge assembly 26b and the second side lower hinge assembly 26d will expand, thereby allowing the hinge balls 30 of the first side lower hinge assembly 26b and the second side lower hinge assembly 26d to be removed from the hinge housings 28 of the first side lower hinge assembly 26b and the second side lower hinge assembly 26d. The gate 14 is then allowed to rotate about the upper axis of rotation 20b as illustrated in FIG. 6B.

Figure 10:
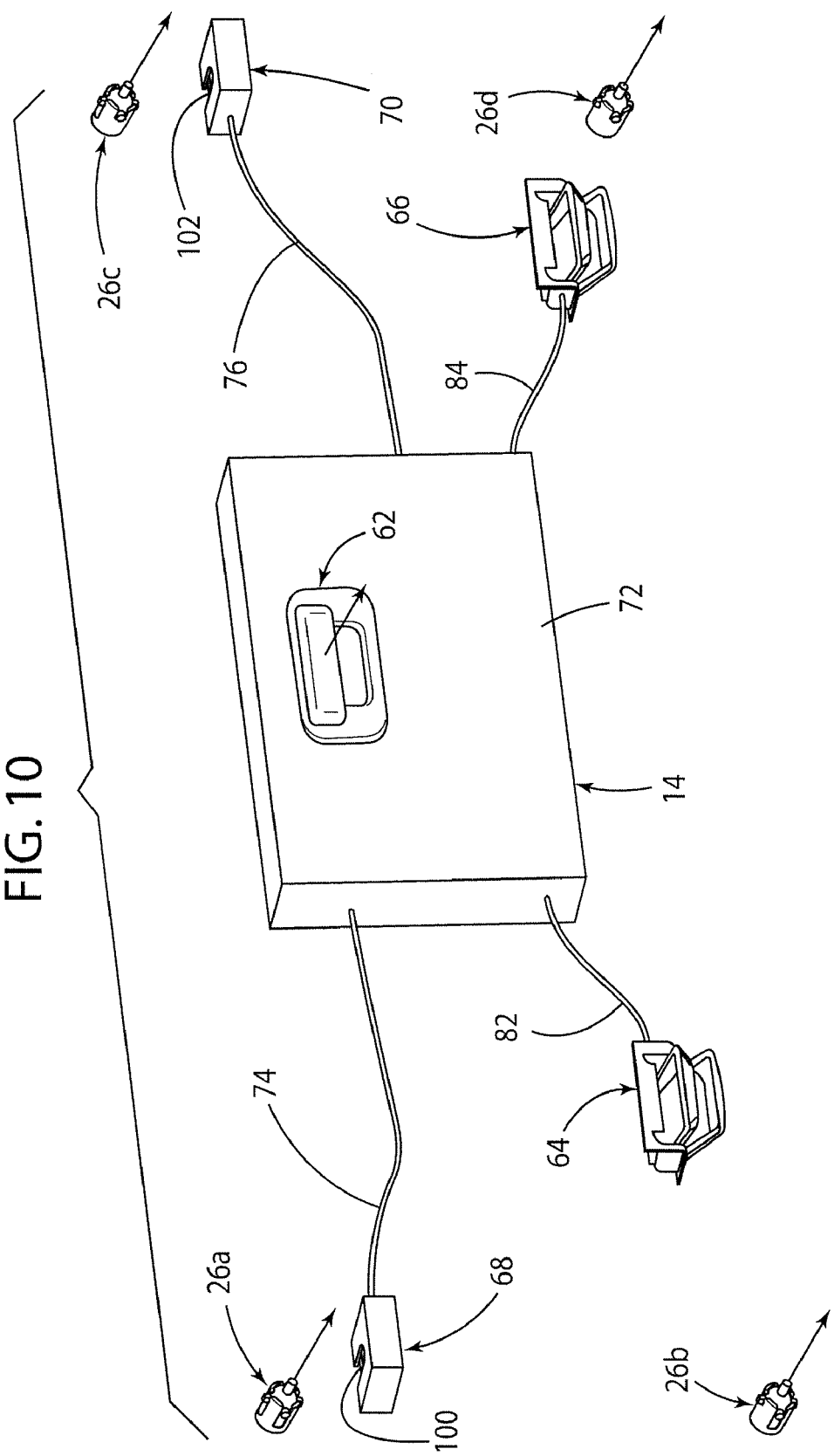
FIG. 10 is a schematic rear view of the tailgate and vehicle of the present invention, with the tailgate in a removable position.

FIG. 10 illustrates the gate 14 being removable from the frame 12. As illustrated in FIG. 10, once the lower first side handle 64 and the lower second side handle 66 are pulled or the center handle 62 is pulled, the first side latch assembly 68 disengages from the first side striker 78 and the second side latch assembly 70 disengages from the second side striker 80. Furthermore, the arms 54 of the cylinders 32 of the hinge housings 28 of the first side upper hinge assembly 26a, the first side lower hinge assembly 26b, the second side upper hinge assembly 26c and the second side lower hinge assembly 26d will expand, thereby allowing the hinge balls 30 of the first side upper hinge assembly 26a, the first side lower hinge assembly 26b, the second side upper hinge assembly 26c and the second side lower hinge assembly 26d to be removed from their hinge housings 28 and allowing the gate 14 to be removed from the frame 12.

It is to be understood that variations and modifications can be made on the aforementioned structure without departing from the concepts of the present invention. For example, while the center handle 62 is illustrated as being located above a horizontal centerline of the gate 14 for easily rotating the gate 14 about the lower axis of rotation 20a, it is contemplated that the center handle 62 could be located anywhere on the gate 14. Likewise, while the lower first side handle 64 and the lower second side handle 66 are illustrated as being located below the horizontal centerline of the gate 14 for easily rotating the gate 14 about the upper axis of rotation 20b, it is contemplated that the lower first side handle 64 and the lower second side handle 66 could be located anywhere on the gate 14. Moreover, while the lower first side handle 64 and the lower second side handle 66 are each illustrated as being located below one side of a vertical centerline of the gate 14 for easily rotating the gate 14 about the second side axis of rotation 20*d* and the first side axis of rotation 20*c*, respectively, it is contemplated that the lower first side handle 64 and the lower second side handle 66 could be located anywhere on the gate 14. Additionally, it is contemplated that the hinge assemblies can be made of any material (e.g., metal, plastic of a combination thereof), the gate 14 can be removable connected to the frame 12 using additional means (e.g., removable straps) for keeping the gate 14 connected to the frame 14 as the gate 14 is rotated and that the slots in cylinder and the posts on the hinge ball could be at configurations other than 90° of a circular (for example, when there are only two or three axes of rotation). Further, it is to be understood that such concepts are intended to be covered by the following claims unless these claims by their language expressly state otherwise.

We claim:

1. A hinge comprising:
a hinge ball including two pairs of aligned posts, each pair of aligned posts including a first post having a circular cross section and a second post having a non-circular cross section; and
a ball receiver configured to removably receive the hinge ball, the ball receiver comprising a cylinder having a plurality of slots;
wherein each slot is configured to have one of the posts located therein;
wherein the hinge ball is configured to be rotated in the ball receiver along two orthogonal axes of rotation, each axis of rotation being aligned with one of the pairs of aligned posts;
wherein the hinge ball can be removed from the ball receiver when the hinge ball is not rotated; and
wherein the hinge ball cannot be removed from the ball receiver once the hinge ball has been rotated about one of the axes of rotation.

2. The hinge of claim 1, wherein:
the plurality of slots comprise two slots each having a mouth, a circular bottom and a constriction between the mouth and the circular bottom; and
the constriction prevents the posts having the non-circular cross section from being removed from the slot having one of the posts having the non-circular cross section therein during rotation of the hinge ball.

3. An assembly comprising:
a frame;
a gate connected to the frame and being pivotable about four axes of rotation forming a rectangle by four hinges; and
each hinge including a ball having posts and a receiver having slots, with each slot being configured to have a post located therein;
each axis of rotation intersecting another one of the axes of rotation at one of the hinges.

4. A pick-up truck comprising:
a frame having a truck bed;
a tailgate removably connected to the frame and being pivotable about the frame along at least two axes of rotation by at least three hinges;
each hinge including a ball having posts and a receiver having slots, with each slot being configured to have a post located therein;
each axis of rotation intersecting another one of the axes of rotation at one of the hinges.

5. A pick-up truck comprising:
a vehicle frame having a truck bed, the truck bed including a first side bed wall, a second side bed wall and a bottom bed wall; and
a tailgate connected to the vehicle frame adjacent the truck bed, the tailgate being removably connected to the truck bed of the vehicle frame, the tailgate being pivotable about the vehicle frame along at least two axes of rotation; and
at least three hinges connected to the vehicle frame and the tailgate for allowing the tailgate to pivot about the at least two axes of rotation;
wherein each axis of rotation intersects at least one of the at least two axes of rotation at an intersection;
wherein one of the hinges is located at the intersection;
wherein the tailgate has at least two handles including a first handle and a second handle;
wherein actuating the first handle allows the tailgate to rotate about a first one of the at least two axes of rotation and actuating the second handle allows the tailgate to rotate about a second one of the at least two axes of rotation;
wherein each hinge includes a hinge ball and a ball receiver, with the hinge ball being connected to the tailgate and the ball receiver being connected to the vehicle frame; and
wherein each hinge ball includes a plurality of pivot posts, each ball receiver includes a plurality of slots, and each slot is configured to have a pivot post located therein.

6. The pick-up truck of claim 5, wherein:
at least two of the posts have a circular cross section; and
at least two of the posts have a non-circular cross section.

7. The pick-up truck of claim 5, wherein:
at least a first one of the hinges has the hinge ball thereof removed from the ball receiver thereof as the tailgate is rotated;
at least a second one of the hinges has the hinge ball thereof remain within the ball receiver thereof as the tailgate is rotated; and
the hinge ball within the ball receiver as the tailgate is rotated prevents the tailgate from being removed from the vehicle frame.

8. The pick-up truck of claim 5, wherein:
the tailgate includes a plurality of latches and actuating the handles actuates at least one of the latches to allow the tailgate to rotate.

9. The pick-up truck of claim 5, wherein:
the at least two handles further includes a third handle; and
actuating the third handle allows the tailgate to rotate about a third one of the at least two axes of rotation.

10. The pick-up truck of claim 9, wherein:
simultaneously actuating the second handle and the third handle allows the tailgate to rotate about a fourth one of the at least two axes of rotation.

11. The pick-up truck of claim 5, wherein:
at least three hinges comprise a first side upper hinge, a first side lower hinge, a second side upper hinge and a second side lower hinge;
at least two axes of rotation comprise a first side axis of rotation, a second side axis of rotation and a lower axis of rotation;
the first side axis of rotation is parallel to the second side axis of rotation; and both the first side axis of rotation and the second side axis of rotation are perpendicular to the lower axis of rotation.

12. The pick-up truck of claim 11, wherein:
the tailgate is rotated about the lower axis of rotation by removing the hinge ball from the ball receiver of the first side upper hinge and the second side upper hinge and by rotating the hinge ball in the hinge receiver of the first side lower hinge and the second side lower hinge.

13. The pick-up truck of claim 11, wherein:
the tailgate is rotated about the first side axis of rotation by removing the hinge ball from the ball receiver of the second side upper hinge and the second side lower hinge and by rotating the hinge ball in the hinge receiver of the first side upper hinge and the first side lower hinge.

14. The pick-up truck of claim 11, wherein:
the tailgate is rotated about the second side axis of rotation by removing the hinge ball from the ball receiver of the first side upper hinge and the first side lower hinge and by rotating the hinge ball in the hinge receiver of the second side upper hinge and the second side lower hinge.

15. An entry assembly comprising:
a frame having a first side and a second side; and
a gate connected to the frame, the gate defining a demarcation between the first side and the second side of the frame, the gate being pivotable about the frame along four axes of rotation;
hinges connected to the vehicle frame and the gate for allowing the gate to pivot about the four axes of rotation;
wherein each axis of rotation intersects two other axes of rotation and the four axes of rotation form a rectangle such that each axis of rotation intersects a first one of the other axes of rotation at a first intersection point and a second one of the other axes of rotation at a second intersection point;
wherein one of the hinges is located at each intersection point;
wherein the gate has at least two handles including a first handle and a second handle;
wherein actuating the first handle allows the gate to rotate about a first one of the axes of rotation and actuating the second handle allows the gate to rotate about a second one of the axes of rotation;
wherein each hinge includes a hinge ball and a ball receiver, with the hinge ball being connected to the gate and the ball receiver being connected to the frame; and
wherein each hinge ball includes a plurality of pivot posts, each ball receiver includes a plurality of slots and each slot is configured to have a pivot post located therein.

16. The entry assembly of claim 15, wherein:
at least two of the posts have a circular cross section; and
at least two of the posts have a non-circular cross section.

17. The entry assembly of claim 15, wherein:
at least a first one of the hinges has the hinge ball thereof removed from the ball receiver thereof as the gate is rotated;
at least a second one of the hinges has the hinge ball thereof remain within the ball receiver thereof as the gate is rotated; and
the hinge ball within the ball receiver as the gate is rotated prevents the gate from being removed from the frame.

18. The entry assembly of claim 15, wherein:
the gate includes a plurality of latches and actuating the handles actuates at least one of the latches to allow the gate to rotate.

19. The entry assembly of claim 15, wherein:
the at least two handles further includes a third handle; and
actuating the third handle allows the gate to rotate about a third one of the axes of rotation.

20. The entry assembly of claim 19, wherein:
simultaneously actuating the second handle and the third handle allows the gate to rotate about a fourth one of the axes of rotation.

21. The entry assembly of claim 15, wherein:
the hinges comprise a first side upper hinge, a first side lower hinge, a second side upper hinge and a second side lower hinge;
the four axes of rotation comprises a first side axis of rotation, a second side axis of rotation, a lower axis of rotation and an upper axis of rotation.

22. The entry assembly of claim 21, wherein:
the gate is rotated about the lower axis of rotation by removing the hinge ball from the ball receiver of the first side upper hinge and the second side upper hinge and by rotating the hinge ball in the hinge receiver of the first side lower hinge and the second side lower hinge.

23. The entry assembly of claim 21, wherein:
the gate is rotated about the first side axis of rotation by removing the hinge ball from the ball receiver of the second side upper hinge and the second side lower hinge and by rotating the hinge ball in the hinge receiver of the first side upper hinge and the first side lower hinge.

24. The entry assembly of claim 21, wherein:
the gate is rotated about the second side axis of rotation by removing the hinge ball from the ball receiver of the first side upper hinge and the first side lower hinge and by rotating the hinge ball in the hinge receiver of the second side upper hinge and the second side lower hinge.

* * * * *